United States Patent [19]

Husted

[11] 3,827,765

[45] Aug. 6, 1974

[54] BRAKE VALVE
[76] Inventor: Royce H. Husted, 711 Lakeside Dr., Wheaton, Ill. 60187
[22] Filed: Jan. 29, 1973
[21] Appl. No.: 327,761

[52] U.S. Cl. .................................. 303/52, 303/6 R
[51] Int. Cl. .............................................. B60t 15/06
[58] Field of Search ........... 303/52, 54, 50, 53, 6 R, 303/6 C, 13, 9; 188/152

[56] References Cited
UNITED STATES PATENTS
3,431,029 3/1969 Boueil et al. .......................... 303/53

FOREIGN PATENTS OR APPLICATIONS
1,494,896 9/1967 France .................................. 303/13

Primary Examiner—Duane A. Reger
Assistant Examiner—D. C. Butler

[57] ABSTRACT

A brake valve for generating a right pressure output through a right pressure output port in response to a force input at a right force input, and a left pressure output through a left pressure output port in response to a force input at a left force input point.

14 Claims, 5 Drawing Figures

BRAKE VALVE

SUMMARY

The present invention relates to a brake valve for generating a right and/or a left pressure output, in response to a right and/or a left driver's force input, normally by utilizing hydraulic power, or by utilizing the driver's force input when the hydraulic power is insufficient.

The brake valve structure includes a yoke having right and left force input and force output points, which is pivotly connected to a first end of a shaft whose second end is inserted into a housing.

The housing contains an open or a closed center means to generate a control pressure, of a corresponding value to the force exerted by the yoke on the shaft, and valve means to block this control pressure from reaching one (the right or left) pressure output port, if the force input at the one side is substantially smaller than the force input at the second side. This is done by the yoke means translating this force difference at the input points, to a force output at the one side, which is used to activate the valve means.

This brake valve is especially suited for agricultural and construction vehicles which require the option of separately braking the vehicle's right wheel (or wheels) or the left wheel (or wheels) to steer, or assist in the steering of the vehicle, or for normal braking, to apply the brakes at both the right and left sides of the vehicle, preferably by generating equal hydraulic output pressure from the brake valve.

The three brake valve embodiments shown, belong to the "mono-fluid" family of brake valves, i.e., these valves discharge output pressure through the same fluid media by which they receive servo-power, which is in this case in the form of a forced fluid flow passing through the valve, for the open center embodiments, or pressurized fluid for the closed center embodiment.

These brake valves are further characterized by normally operating in a "full-power" mode, i.e., the valves use the driver's force input only as a signal, but not to perform, fully or partially, the actual work of applying the hydraulically actuated foundation brakes, which are connected to it. However during power-off operation the valve automatically switches to a hydrostatically manual mode of operation in which it translates the driver's force input to work in the form of pressurized fluid output.

Currently, valves that are designed to accomplish these functions usually comprise two, at least partially redundant and inter-connected brake valves which are integrated into one physical assembly.

Applicant shows a single, extremely simple and economical to manufacture brake valve which is uniquely combined with a yoke and valving means to perform the above discussed functions.

DETAILED DESCRIPTION OF THE FIGURES

Figure 1:
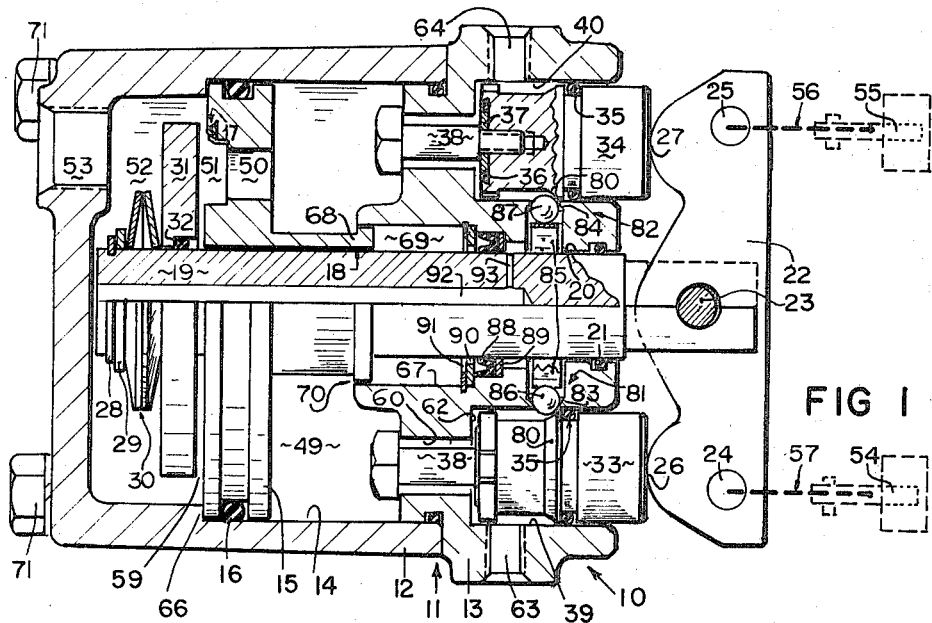
FIGS. 1 and 2 show sectional top and side views, respectively, of a first embodiment in which the generation of the control pressure is done in an open center mode.
Figure 2:
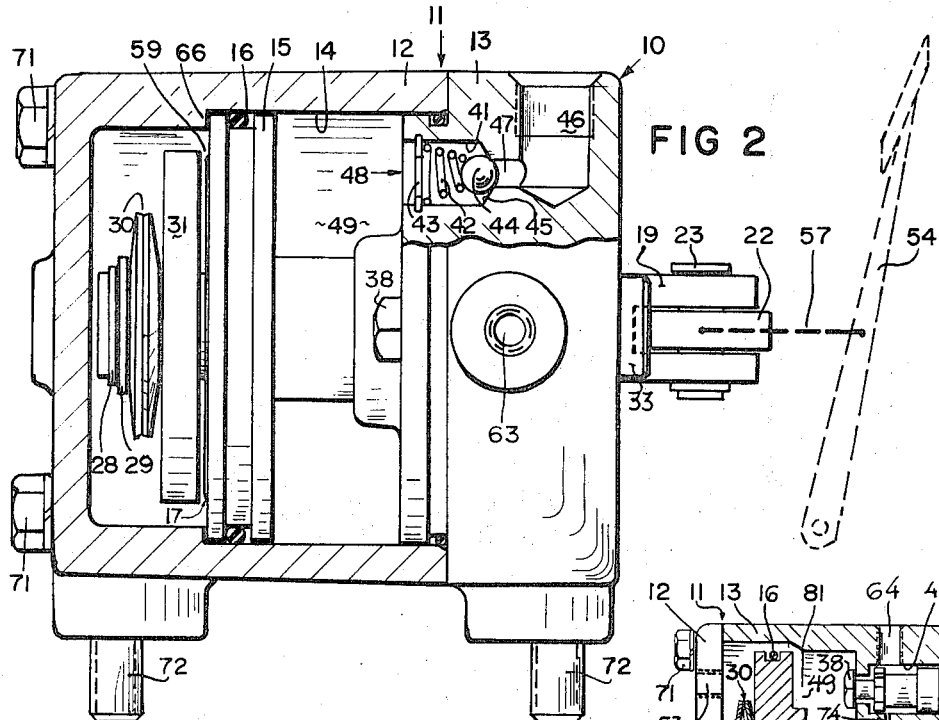
Figure 3:
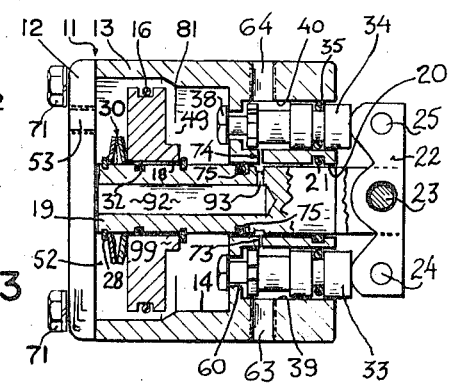
FIG. 3 shows a sectional top view of a second embodiment which is a simplified version of the embodiment shown in FIG. 1, FIGS. 4 and 5 show a sectional top and side views, respectively of a third embodiment in which the generation of the control pressure is done in a closed center mode.
Figure 4:
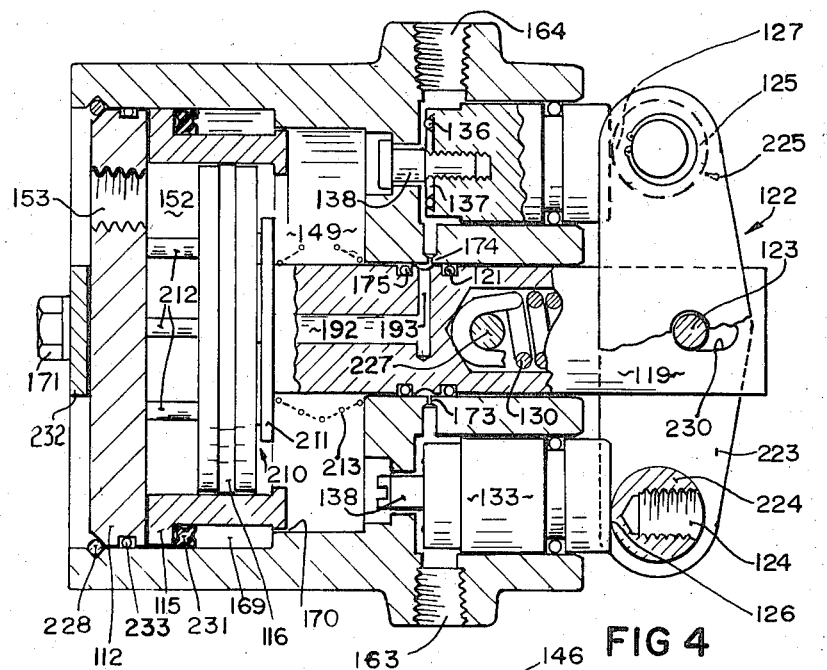
Figure 5:
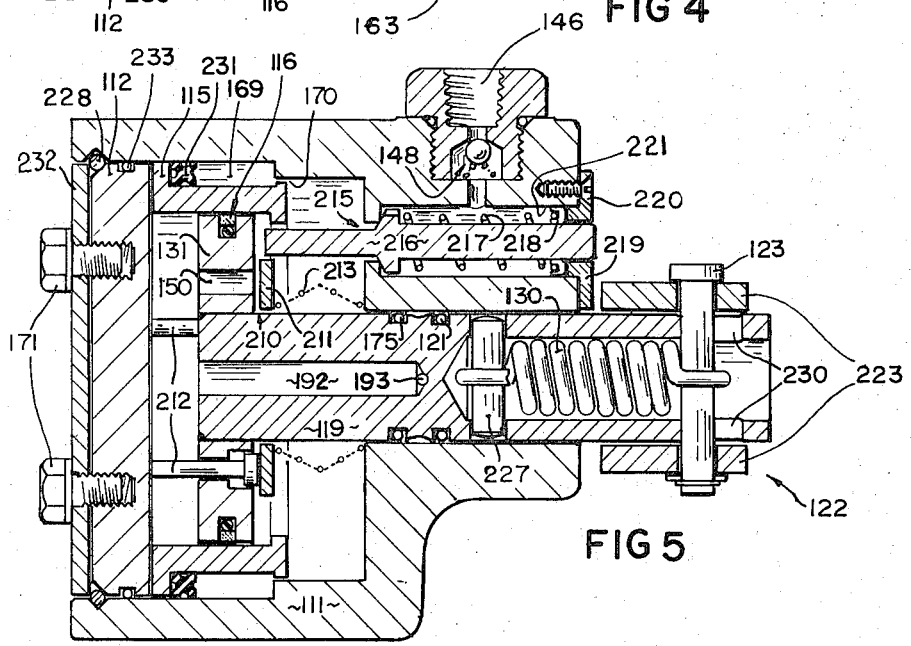

Parts of the first embodiment shown in FIGS. 1 and 2 areindicated by numerals between 1–100. Corresponding parts of the second embodiment, shown in FIG. 3, are indicated by the same numerals where possible, to ease correlation between the two open center embodiments. Corresponding parts of the third embodiment shown in FIGS. 4 and 5 are formed by adding 1 in front of the numeral used in previous FIGURES, where applicable, again to ease correlation between the open center and closed center embodiments of the invention.

Reference will now be made to the first embodiment, shown in FIGS. 1 and 2, in which a brake valve 10 for generating a right pressure output through a right pressure output port 63, and/or a left pressure output, through a left pressure output port 64 in response to a right and/or a left force input, respectively, comprising:

A yoke 22 having a right and a left force input points, 24 and 25 respectively, and a right and a left force output points 26 and 27. The yoke 22 is pivotly connected to a first end of a shaft 19, by a pin 23. The shaft's 19 second end is inserted into a housing 11 of the brake valve 10. The housing 11 which is made of a front section 13 and a rear section 12, secured one to the other by bolts 71, and equipped with mounting bolts 72, contains:

Means for generating a control pressure corresponding in its value to the pulling force exerted by the yoke 22 through the pin 23 on the shaft 19, in a chamber 49.

A right valve assembly 33 is disposed in a bore 39, and includes a seal 35 and a face seal 36 which is held by a washer 37 which is secured by a bolt 38 which which also prevents the valve 33 from exiting the bore 39 beyond a permitted travel. The bolt 38 is designed not to block the communication between the chamber 49 and a bore 60. The function of the valve 33 is to block the control pressure prevailing in the chamber 49 from the right pressure output port 63 by the abutment of the face seal 36 against a surface 62 in response to a force exerted on it by the yoke 22 through the right force output point 26.

A left valve assembly 34 which is disposed in a bore 40 is identical to the right valve assembly 33 and is adapted to block the control pressure from the left output port in response to force exerted on it by the yoke 22 through the left force output point 27. The yoke 22 is adapted to exert the pulling force on the shaft 19 through the pin 23 in response to a pulling force applied at its right and/or left force input points 24 and 25 respectively, by a driver through a right pedal 54 and a right pull-rod 57 and/or a left pedal 55 and a left pull-rod 56, respectively. In addition the yoke 22 is adapted:

To exert the force on the right valve assembly 33 in response to the force that it receives at the right force input point 24 being substantially smaller than the force that it receives at the left force input point 25.

In a similar manner the yoke 22 exerts the force on the left valve 34 when the relationship between the two forces at the force input points 24 and 25 is reversed.

The exact quantitative relationship between the size of the forces, the areas of the valves 33 and 34 and the exact geometry of the yoke 22 that will assure activation of the valves 33 or 34 is obvious to one familiar with the art.

A right and a left venting assemblies 81 and 82 respectively are used to prevent a pressure from prevailing in the right or the left pressure output port 63 or 64 respectively, while this port is being blocked from chamber 49, as previously discussed. The venting assembly 81 comprises a ball 86 which is urged by a toroidal flat wavey spring 85 common to both venting assemblies 81 and 82, against a conical seat 83. When the valve 33 is pushed forward by the yoke 22 to block communication between the chamber 49 and the port 63 a shoulder 80 formed on it mechanically unseats the ball 86 and opens communication between the port 63 and a vented chamber 52 through passages 92 and 93 formed in the shaft 19.

The passage 93 is restrictive enough to enable the brake valve 10 to build pressure in either ports 63 or 64 even while the venting means are accidentally open, but is large enough to assure the venting of either port when its respective valve 33 or 34 blocks it from the chamber 49.

The chamber 49 is defined within a bore 14, by a stationary end-wall provided by the front section 13 of the housing and by a moveable wall. The moveable wall consists of an annular piston 15 carrying a seal 16 and a face seal 17, and by a reaction piston 31 attached to the shaft's 19 second end. Normally, the annular piston 15 rests against a shoulder 66 formed in the bore 14, and the reaction piston 31 is spaced away from it, leaving between the two pistons a circumferential variable orifice 59, that if unfolded would have a rectangular shape with a base dimension equalling roughly the circumference of the seal 17, for example, several inches, and a much smaller height dimension equalling the distance between the seal 17 and the reaction piston 31, for example, a small fraction of an inch. Thus, it takes a small movement of the reaction piston 31 towards the annular piston 15 in order to change the character of the variable orifice 59 from practically unrestrictive to highly restrictive. This is desirable in view of the fact that during the initial foundation brakes' fill-up period (the foundation brakes are the recipients of the output pressure from the ports 63 and 64, and are not shown) a substantial part of the flow is diverted to accomplish this function, and does not pass the variable orifice 59, but an instant later all flow has to resume passage through the variable orifice 59. Accordingly, the reaction piston 31 has to over-advance towards the annular piston 15, and an instant later to partially retreat. The above discussed design of the variable orifice 59 is helpful in minimizing the actual length of this retreat which is obviously a fraction of the normal spacing between the two pistons. A resilient spring 30 which is made up of two belleville spring washers is backed by a washer 29 and a snap ring 28 and assists in further minimizing the kickback transmitted to the brake pedals 54 and/or 55 as a result of the discussed kickback of the reaction piston 31 and it also minimizes any pressure fluctuations in the chamber 49 caused by it.

Dampening means to dampen the movement of the moveable wall, or specifically the movement of the annular piston 15 relative to the housing 11, are provided in the form of an annular damper chamber 69 defined by a bore 67 and around the shaft 19, by a seal 88 backed by a washer 89 and by a sleeve extension of the annular piston 68. The dampening means control the movement of the annular piston 15 that may occur due to a sudden force application at the force input points 24 and/or 25, especially if the fill-up transient in a particular brake system is relatively long. The damper characteristics can be changed by changing a gap 70 between the sleeve 68 and the bore 67 through which the bulk of the fluid contained in the chamber 69 has to exit through, while the annular piston 15 advances in the bore 14. Normally, that is during power-on operation, sufficient fluid flow enters an inlet 46, continues through a passage 47 and enters the chamber 49 through a check valve assembly 48 comprising a ball 44 which is urged against a conical seat 45 by a spring 42 which is backed by a snap ring 43. The fluid flow continues through the chamber 49 and exits it through holes 50 leading to an annular open groove 51 formed in the piston 15 which leads to the variable orifice 59. In view of the preceding description of unit's construction, its operation is self-explanatory:

Normally, during power-on operation, sufficient fluid flow enters the inlet 46, passes the check-valve 48 into the chamber 49, continues through holes 50, into the vented chamber 52 and eventually through an outlet 53. In response to a pulling force applied at the force input points 24 and/or 25 the yoke 22 will pull the shaft 19 and the reaction piston 31, restricting the flow through the variable orifice 59 to a point that the control pressure in the chamber 49 will be large enough to exert a balancing force on the reaction piston 31, to counter the pull exerted by the yoke 22. If the forces at both force input point 24 and 25 will be equal, these forces will mutually balance one another, however, if one of these forces will be substantially smaller, the yoke 22 at its side will exert a force output on the respective valve assembly 33 or 34, whichever, blocking the respective pressure output port 63 or 64 from the chamber 49. If the fluid flow that is forced into the inlet 46 is insufficient the brake valve 10 will shift to a power-off mode of operation. In this mode of operation the reaction piston 31 will engage the annular piston 15 sealing the chamber 49 by means of the seal 17 and continue to move with it, in unison, pulling it away from the step 66 against which it normally rests, decreasing the volume of the chamber 49, and thereby manually pumping pressurized fluid through the ports 63 and/or 64. At the same time the check valve 48 will prevent an up-stream flow of fluid from the chamber 49 to the inlet 46.

Some construction details that may be noted are; a bearing 20 formed in the front section of the housing 13 and an adjacent seal 21, and a bearing 18 formed in the reaction piston 31.

A second, simpler embodiment is shown in FIG. 3, also utilizing an open center power-on mode of creating the control pressure within its chamber 49. As is readily noted, the second embodiment contains a yoke 22, valve assemblies 33 and 34 and several other related parts that are practically similar to parts indicated by same numerals on FIGS. 1 and 2. The function and operation of these parts is self-explanatory in view of the previous discussion of the first embodiment. Thus, the discussion of the second embodiment will be directed to points in which it differs from the first embodiment.

A right and a left venting means are provided in a form of orifices 73 and 74 respectively which restrictively communicate the right and left pressure output ports 63 and 64 respectively, through passages 92 and 93 to a vented chamber 52. During a power-on operation, while a control pressure prevails in the chamber 49 continuous bleeding will occur through the orifice 73 as long as the valve 33 will not be energized by the yoke 22, however, the orifice 73 is made to be restrictive enough so that during power-on operation the flow through it is insignificant compared to the flow entering the chamber 49 (through an inlet and a check valve, not shown).

If, however, the valve assembly 33 is pushed by the yoke 22 separating the port 63 from the chamber 49, then the bleeding through the orifice 73 is sufficient to bleed down any prior pressure that may have been prevailing in the port 63, and to prevent any pressure build-up in the port 63 due to leakage across the valve assembly 33. Obviously, the orifice 74 serves a similar function in respect to the left pressure output port 64.

The variable orifice in the second embodiment is defined between a moveable wall made of a reaction piston 99 and a circumferential step 81 formed on the bore 14. During power-off operation the reaction piston 99 is adapted to continue and advance into the bore 14, sealing the chamber 49 and accomplishing a manual pumping of fluid. Under this condition a bleed-down of either ports 63 or 64 is objectionable, and is avoided by the fact that at this condition a seal 75 passes over the orifices 73 and 74 separating them from passages 93 and 92.

It may be noted that by forming the moveable wall from one part, the power-on and power-off pedal effort will be substantially similar, but in power-off the travel of the pedal will be long. By making the moveable wall from two parts, 31 and 15, as shown in the first embodiment, the power-off pedal travel is shortened but the effort is proportionally increased. This often yields a more desirable compromise in view of space limitation in the vehicle, and human limitation on the part of the driver.

On the other hand, the foundation brakes may require so much work input in order to effectively brake the vehicle that the manual mode of operation may be useless, and eliminated altogether by slightly enlarging the diameter of the reaction piston 99 so it cannot pass over the step 81.

The third embodiment shown in FIGS. 4 and 5 also has the basic features of a yoke 122 and a right and a left valve assemblies, 133 and 134 respectively, which control the communication between a chamber 149 containing a control pressure and a right and a left pressure output ports, 163 and 164 respectively.

Thus, the differences between the third embodiment to the previous embodiments which will be discussed in the following paragraphs, reside in the fact it generates the control pressure in a closed center mode of operation, and, in some constructual details.

The brake valve 110 has a normally open valve 210 which comprises a flat steel washer 211 coated with a thin layer of elastomer, which is spaced from a reaction piston 131 by three pins 212 which abut against a cover 112, when the reaction piston 131 is fully retracted. A double cone shaped compression spring 213 urges the washer 211 towards the reaction piston 131. A normally closed valve 215 contained in a bore 221 comprises, a spool 216, an energizing spring 217 and a seal 218 backed by a collar 219 which is secured to a housing 111 by screws 220 (one shown). The valve 215 is adapted to normally block a high pressure fluid which is supplied through an inlet 146 passing a check-valve assembly 148 and prevailing in the bore 221.

In response to a force exerted by the yoke 122 through a pin 123, a shaft 119 is moved, pulling the reaction piston 131 which is welded to it. The movement of the reaction piston 131 away from the cover 112 permits the spring 213 to push the washer 211 and the pins 212 leftwards until the washer 211 is seated against the piston 131, thereby sealing holes 150 which provide communication between the chamber 149 and the vented chamber 152. As the reaction piston continues to advance, it engages the spool 216 and pushes it, thereby opening the bore 221 to the chamber 149, and permitting pressurized fluid to enter it. Thus, pressure is being built up in the chamber 149 until the force that it exerts on the reaction piston 131 balances the force exerted on it by the yoke 122, through the pin 123 and the shaft 119, at which point the piston 131 will retreat, permitting closure of the valve 215. If the force exerted by the yoke 122 on the reaction piston 131 is reduced, the reaction piston will retreat slightly more, opening the valve 210 and dumping sufficient fluid to reduce the pressure in the chamber 49 until the balance between the force exerted by this pressure on the reaction piston 131 and the force exerted on it by the yoke 122, is restored.

The venting means in the third embodiment are similar to those shown in connection to the second embodiment, and comprises orifices 173 and 174 which maintain restrictive communication between the output ports 163 and 164 at the power-on condition, which communication is blocked by a seal 175 passing over the orifices and separating them from passage 93 during power-off operation of the brake valve 110.

The yoke 122 comprises in the third embodiment, two plates 223 between which right and left cylinders 224 and 225 respectively, are secured. The cylinder 224 has a right force input-point 124 in the form of a thread for accepting a pull rod (not shown) and a force output point 126 defined on the surface of the cylinder 224 and adapted to push the right valve 133.

The left cylinder 225 similarly contains a force input and a force output points 125 and 127 respectively.

The plates 223 are pivoted on a pin 123 which is disposed in slots 230 formed in the shaft 119 and is attached to one end of a tension spring 130 whose other end is attached to the shaft 119 through a pin 227, adding resiliency between the shaft 119 and the yoke 122.

A damper chamber 169 is defined around an annular piston 115, a seal 231 and by the housing 111.

The rear cover 112 carrying a seal 233 is backed by a snap ring 228, and a flat piece 232 secured to it by bolts 171 which prevents it from being sucked into the housing 111 during power-off operation.

It may be noted that a seal 116 is made from a teflon filled seal with a square cross section, which is energized by an O-ring seal from underneath, to minimize friction between the pistons 131 and 115.

While a limited number of embodiments was used to illustrate and explain the invention, it is obvious that changes and modifications can be made in the embodiments, without departing from the scope and spirit of the invention.

I claim:

1. A brake valve for generating, at least one of, a right pressure output through a right pressure output port in response to a force input at a right force input point, and, a left pressure output through a left pressure output port in response to a force input at a left force input point, comprising;

a yoke having said right and said left force input points, and a right and a left force output points, and a pivot connection to a first end of a shaft whose second end is inserted into a housing, said housing having;

means for generating a control pressure, in a chamber, which corresponds to the force exerted by said yoke on said shaft, through said pivot connection, a right valve means for blocking said control pressure from said right pressure output port, in response to a force exerted on it by said yoke through said right force output point, and, a left valve means for blocking said control pressure from said left pressure output port, in response to a force exerted on it by said yoke through said left force output point, said yoke adapted to exert said force on said shaft through said pivot connection in response to a force applied to at least one of its said right or left force input points, and in addition;

to exert said force on said right valve means, through its said right force output point, in response to the force at its said right force input point being substantially smaller than the force at its left force input point, or, to exert said force on said left valve means, through its said left force output point, in response to the force at its said left force input point being substantially smaller than the force at its right force input point.

2. A brake valve as in claim 1, having venting means to prevent a pressure from prevailing in said right, or, said left pressure output port, while it is being blocked from said chamber by said right, or, said left valve means, respectively.

3. A brake valve as in claim 1, said pressure generating means adapted to generate a control pressure which is active against one face of a moveable wall which is attached to said second end of said shaft, thereby generating a reaction force on said shaft which balances the force exerted on it by said yoke through said pivot connection.

4. A brake valve as in claim 1, said chamber confined within a bore defined by said housing, by a stationary end wall at one end of said bore through which said shaft is inserted into said housing and by said moveable wall to which said second shaft's end is connected.

5. A brake valve as in claim 4, said shaft and said moveable wall adapted to move in response to a force exerted on said shaft by said yoke through said pivot connection and to, thereby, decrease the volume of said chamber during power-off operation of the brake valve.

6. A brake valve as in claim 4, said moveable wall comprising a reaction piston.

7. A brake valve as in claim 4, said moveable wall comprising an annular piston which is normally, during power-on operation, at rest, and a reaction piston which is connected to said second end of said shaft, and which is adapted to engage said annular piston after a relative travel therein between the two pistons took place, and move it, thereby decreasing the volume of said chamber during power-off operation of the brake valve.

8. A brake valve as in claim 4, having dampening means to dampen the movement of said moveable wall relative to said housing.

9. A brake valve as in claim 4, having resilient means between said yoke and said moveable wall.

10. A brake valve as in claim 4, having a flow passage initiating at an inlet and ending at an outlet, comprising;

a check-valve for preventing upstream flow in said flow passage, a variable orifice adapted to restrict flow through said passage in response to a force applied to said shaft by said yoke through said pivot connection, said chamber in which said control pressure prevails being in communication with said flow passage at a point which is between said check-valve and said variable orifice.

11. A brake valve as in claim 10, said variable orifice is a rectangular opening with a large, constant, base dimension and a small, variable, height dimension which is decreased in response to a force on said shaft by said yoke through said pivoted connection.

12. A brake valve as in claim 10, said variable orifice as defined between said moveable wall and a circumferential step formed on said bore.

13. A brake valve as in claim 10, said moveable wall comprising an annular piston and a reaction piston between which said variable orifice is defined.

14. A brake valve as in claim 4, having a normally open valve which maintains said chamber vented, and a normally closed valve which is adapted to block pressurized fluid from entering said chamber, said normally open valve adapted to close and said normally closed valve adapted to open in response to a force exerted on said shaft by said yoke through said pivot connection.

* * * * *